(12) United States Patent
Huang et al.

(10) Patent No.: US 9,881,234 B2
(45) Date of Patent: Jan. 30, 2018

(54) SYSTEMS AND METHODS FOR END-TO-END OBJECT DETECTION

(71) Applicant: Baidu USA, LLC, Sunnyvale, CA (US)

(72) Inventors: Lichao Huang, Beijing (CN); Yi Yang, San Jose, CA (US); Yafeng Deng, Beijing (CN); Yinan Yu, Beijing (CN)

(73) Assignee: Baidu USA LLC., Sunnyvale, CA (US)

( * ) Notice: Subject to any disclaimer, the term of this patent is extended or adjusted under 35 U.S.C. 154(b) by 0 days.

(21) Appl. No.: 15/230,229

(22) Filed: Aug. 5, 2016

(65) Prior Publication Data

US 2017/0147905 A1 May 25, 2017

Related U.S. Application Data

(60) Provisional application No. 62/260,149, filed on Nov. 25, 2015.

(51) Int. Cl.
*G06K 9/00* (2006.01)
*G06K 9/62* (2006.01)

(52) U.S. Cl.
CPC ......... *G06K 9/6232* (2013.01); *G06K 9/6257* (2013.01); *G06K 9/6261* (2013.01); *G06K 9/6269* (2013.01)

(58) Field of Classification Search
None
See application file for complete search history.

(56) References Cited

U.S. PATENT DOCUMENTS

| | | | | | |
|---|---|---|---|---|---|
| 5,642,431 | A | * | 6/1997 | Poggio | G06F 17/30259 235/380 |
| 7,643,702 | B1 | * | 1/2010 | Brandt | G06K 9/00986 382/190 |

(Continued)

OTHER PUBLICATIONS

Yang et al., "Fine-grained evaluation on face detection in the wild," In Automatic Face and Gesture Recognition (FG), 11th IEEE International Conference on. IEEE, 2015 (7pgs).

(Continued)

*Primary Examiner* — Tahmina Ansari
(74) *Attorney, Agent, or Firm* — North Weber & Baugh LLP

(57) ABSTRACT

Presented are systems and methods that provide a unified end-to-end detection pipeline for object detection that achieves impressive performance in detecting very small and highly overlapped objects in face and car images. Various embodiments of the present disclosure provide for an accurate and efficient one-stage FCN-based object detector that may be optimized end-to-end during training. Certain embodiments train the object detector on a single scale using jitter-augmentation integrated landmark localization information through joint multi-task learning to improve the performance and accuracy of end-to-end object detection. Various embodiments apply hard negative mining techniques during training to bootstrap detection performance. The presented are systems and methods are highly suitable for situations where region proposal generation methods may fail, and they outperform many existing sliding window fashion FCN detection frameworks when detecting objects at small scales and under heavy occlusion conditions.

20 Claims, 12 Drawing Sheets

(56) References Cited

U.S. PATENT DOCUMENTS

| | | | | |
|---|---|---|---|---|
| 9,547,805 | B1* | 1/2017 | Erignac | G06K 9/6256 |
| 2015/0278628 | A1* | 10/2015 | Agrawal | G06K 9/4647 |
| | | | | 382/156 |
| 2016/0307072 | A1* | 10/2016 | Zhou | G06K 9/6267 |
| 2017/0124409 | A1* | 5/2017 | Choi | G06N 3/0454 |
| 2017/0147905 | A1* | 5/2017 | Huang | G06K 9/6232 |

OTHER PUBLICATIONS

Yang et al., "Articulated human detection with flexible mixtures-of-parts," Pattern Analysis and Machine Intelligence, IEEE Transactions on, 35(12):2878-2890, IEEE, 2013.

Yu et al., "Object detection by context and boosted HOG-LBP," In VOC Workshop Talk, p. 104, 2010 (25pgs).

Zhang et al., "Boosted local structured HOG-LBP for object localization," In Computer Vision and Pattern Recognition (CVPR), 2011 IEEE Conference on, pp. 1393-1400. IEEE, 2011 ( pgs).

Zhu et al., "Face detection, pose estimation, and landmark localization in the wild," In Computer Vision and Pattern Recognition (CVPR), 2012 IEEE Conference on, pp. 2879-2886. IEEE, 2012 (8pgs).

Zhu et al., "Face Detection, Pose Estimation, and Landmark Localization in the Wild," Dept. of Compute Science, University of CA, Irvine (8 pgs).

Huang et al., "DenseBox: Unifying Landmark Localization with End to End Object Detection," <URL: http://arxiv.org/pdf/1509.04874v1.pdf,Sep. 16, 2015 (13 pgs).

Jain et al., "FDDB: A benchmark for face detection in unconstrained settings," UMass Amherst Technical Report, 2010 (11pgs).

Krizhevsky et al., "ImageNet classification with deep convolutional neural networks," In Advances in neural information processing systems, pp. 1097-1105, 2012 (9pgs).

Wu et al., "Integrating context and occlusion for car detection by hierarchical and-or model," In Computer Vision—ECCV 2014, pp. 652-667. Springer, 2014 (30pgs).

Li et al., "A convolutional neural network cascade for face detection," In Proceedings of the IEEE Conference on Computer Vision and Pattern Recognition, pp. 5325-5334, 2015 (10pgs).

Li et al., "Heterogeneous multi-task learning for human pose estimation with deep convolutional neural network," In Computer Vision and Pattern Recognition Workshops (CVPRW), 2014 IEEE Conference on, pp. 488-495. IEEE, 2014 (8pgs).

Liu et al., "ParseNet: Looking wider to see better," arXiv preprint arXiv:1506.04579, 2015 (8pgs).

Long et al., "Accurate object detection with location relaxation and regionlets re-localization," In Computer Vision—ACCV 2014, pp. 260-275.Springer, 2015 (15pgs).

Long et al., "Fully convolutional networks for semantic segmentation," In Proceedings of the IEEE Conference on Computer Vision and Pattern Recognition, pp. 3431-3440, 2015.

Sermanet et al., "OverFeat: Integrated recognition, localization and detection using convolutional networks," arXiv preprint arXiv:1312.6229, 2013 (16pgs).

Simonyan et al., "Very deep convolutional networks for large-scale image recognition," arXiv preprint arXiv:1409.1556, 2014 (14pgs).

Szegedy et al., "Going deeper with convolutions," arXiv preprint arXiv:1409.4842, 2014 (9pgs).

Tompson et al., "Joint training of a convolutional network and a graphical model for human pose estimation," In Advances in Neural Information Processing Systems, pp. 1799-1807, 2014 (9pgs).

Vaillant et al., "An original approach for the localisation of objects in images," IEEE Proceedings—Vision, Image and Signal Processing, 141(4):245-250, 1994 (16pgs).

Viola et al., Robust real-time face detection. International journal of computer vision, 57(2):137-154, 2004 (18pgs).

Xiang et al., "Data-driven 3D voxel patterns for object category recognition," In Proceedings of the IEEE Conference on Computer Vision and Pattern Recognition, pp. 1903-1911, 2015 (9pgs).

Yan et al., "Object detection by labeling superpixels," In Proceedings of the IEEE Conference on Computer Vision and Pattern Recognition, pp. 5107-5116, 2015 (10pgs).

Bengio et al., "Representation learning: A review and new perspectives," Pattern Analysis and Machine Intelligence, IEEE Transactions on, 35(8):1798-1828, 2013 (30pgs).

Bertasius et al., "DeepEdge: A multi-scale bifurcated deep network for top-down contour detection," arXiv preprint arXiv:1412.1123, 2014 (10pgs).

Chen et al., "3D object proposals for accurate object class detection," In NIPS, 2015 (9pgs).

Cinbis et al., "Segmentation driven object detection with fisher vectors," In Computer Vision (ICCV), 2013 IEEE International Conference on, p. 2968-2975. IEEE, 2013, 9pgs.

Dalai et al., "Histograms of oriented gradients for human detection," In Computer Vision and Pattern Recognition, 2005. CVPR 2005. IEEE Computer Society Conference on, vol. 1, pp. 886-893. IEEE, 2005 (8pgs).

Devries et al., "Multi-task learning of facial landmarks and expression," In Computer and Robot Vision (CRV), 2014 Canadian Conference on, pp. 98-103. IEEE, 2014.

Dollar et al., "Crosstalk cascades for frame-rate pedestrian detection," In Computer Vision—ECCV 2012, pp. 645-659. Springer, 2012 (14pgs).

Erhan et al., "Scalable object detection using deep neural networks," In Computer Vision and Pattern Recognition (CVPR), 2014 IEEE Conference on, pp. 2155-2162. IEEE, 2014 (8pgs).

Lowe, "Distinctive image features from scale-invariant keypoints," International journal of computer vision, 60(2):91-110, 2004 (28pgs).

Ouyang et al., "DeepID-net: multi-stage and deformable deep convolutional neural networks for object detection," arXiv preprint arXiv:1409.3505, 2014 (13pgs).

Pepik et al., "What is holding back convnets for detection?," arXiv preprint arXiv:1508.02844, 2015 (12pgs).

Pinheiro et al., "Learning to segment object candidates," arXiv preprint arXiv:1506.06204, 2015 (10pgs).

Redmon et al., "You only look once: Unified, real-time object detection," arXiv preprint, abs/1506.02640, 2015 (10pgs).

Ren et al., "Faster R-CNN: Towards real-time object detection with region proposal networks," arXiv preprint arXiv:1506.01497, 2015 (14pgs).

Rowley et al., "Neural network-based face detection. Pattern Analysis and Machine Intelligence," IEEE Transactions on, 20(1):23-38, 1998 (28pgs).

Rowley et al., "Rotation invariant neural network-based face detection," In Computer Vision and Pattern Recognition, 1998, Proceedings. 1998 IEEE Computer Society Conference on, pp. 38-44. IEEE, 1998 (7pgs).

Russakovsky, "ImageNet large scale visual recognition challenge," International Journal of Computer Vision, pp. 1-42, 2014 (43pgs).

Everingham et al., "The PASCAL visual object classes (VOC) challenge," International journal of computer vision, 88(2):303-338, 2010 (34pgs).

Farfade et al., "Multi-view face detection using deep convolutional neural networks," arXiv preprint arXiv:1502.02766, 2015 (8pgs).

Felzenszwalb et al., "Object detection with discriminatively trained part based models," Pattern Analysis and Machine Intelligence, IEEE Transactions on, 32(9):1627-1645, 2010 (20pgs).

Felzenszwalb et al., "Pictorial structures for object recognition," International Journal of Computer Vision, 61(1):55-79, 2005 (42pgs).

Geiger et al., "Are we ready for autonomous driving? the KITTI vision benchmark suite," In Conference on Computer Vision and Pattern Recognition (CVPR), 2012 (8pgs).

Girshick, "Fast R-CNN," arXiv preprint arXiv:1504.08083, 2015 (9pgs).

Girshick et al., "Rich feature hierarchies for accurate object etection and semantic segmentation," In Computer Vision and Pattern Recognition (CVPR), 2014 IEEE Conference on, pp. 580-587. IEEE, 2014 (21pgs).

(56) References Cited

OTHER PUBLICATIONS

He et al., "Spatial pyramid pooling in deep convolutional networks for visual recognition," In Computer Vision—ECCV 2014, pp. 346-361. Springer, 2014 (14pgs).

* cited by examiner

775

Table 1

| Method | Moderate | Easy | Hard |
|---|---|---|---|
| Regionlets | 76.45% | 84.75% | 59.70% |
| AOG | 74.26% | 84.24% | 60.51% |
| 3DVP | 75.77% | 87.46% | 65.38% |
| spCov_LBP | 77.40% | 87.19% | 60.60% |
| DeepInsight | 84.40% | 84.59% | 76.09% |
| NIPS ID 331 | 87.14% | 88.33% | 76.11% |
| DJML | 88.79% | 91.31% | 77.73% |
| DenseBox (without landmark locatization) | 85.07% | 82.33% | 76.27% |
| DenseBox (with landmark locatization) | 85.74% | 83.63% | 76.71% |

FIG. 7C

SYSTEMS AND METHODS FOR END-TO-END OBJECT DETECTION

CROSS-REFERENCE TO RELATED APPLICATION

This application claims the priority benefit under 35 USC § 119(e) to commonly assigned U.S. Provisional Patent Application No. 62/260,149, filed on Nov. 25, 2015, entitled "Dense Box: Unifying Landmark Localization with End-to-End Object Detection" and listing Lichao Huang, Yi Yang, Yafeng Deng, Yinan Yu as inventors. The aforementioned patent document is incorporated by reference herein in its entirety and for all purposes.

BACKGROUND

A. Technical Field

The present invention relates to computer processing and, more particularly, to systems, devices, and methods for end-to-end object recognition in computer vision applications.

B. Description of the Related Art

Our day-to-day lives abound with instances of object detection. Detecting nearby vehicles while driving a car, or localizing a familiar face all examples of object detection. Object detection is one of the core tasks in computer vision applications. Before the success of convolutional neural networks (CNNs), object detection generally involved sliding window based methods that apply classifiers on hand-crafted features that are extracted at all possible locations and various scales of an image. Recently, fully convolutional neural network (FCN) based methods revolutionized the field of object detection. While FCN frameworks also use a sliding window method, their end-to-end approach of learning model parameters and image features from scratch significantly improves detection performance.

Region-based CNN (R-CNN) methods further improve the accuracy of object detection beyond FCN-based methods. Conceptually, R-CNN operates in two phases. In a first phase, region proposal methods generate all potential bounding box candidates in the image. In a second phase, for every proposal, a CNN classifier is applied to distinguish between objects. Although R-CNN is gradually evolving as the new state-of-the-art system for general object detection, it continues to suffer from the inability to detect small objects, such as human faces, and distant objects, such as cars, as the low resolution and lack of context in each candidate box significantly decreases classification accuracy. Moreover, the two different stages in the R-CNN pipeline cannot be optimized jointly, which makes the application of end-to-end training on R-CNN rather problematic. Accordingly, what is needed are systems and methods that overcome the limitations of existing designs.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 7C displays a table, TABLE 1, which illustrates experimental results comparing average precision on KITTI car detection task of traditional detection systems to a DenseBox embodiment according to various embodiments of the present disclosure.

DETAILED DESCRIPTION OF THE PREFERRED EMBODIMENTS

Figure 1:
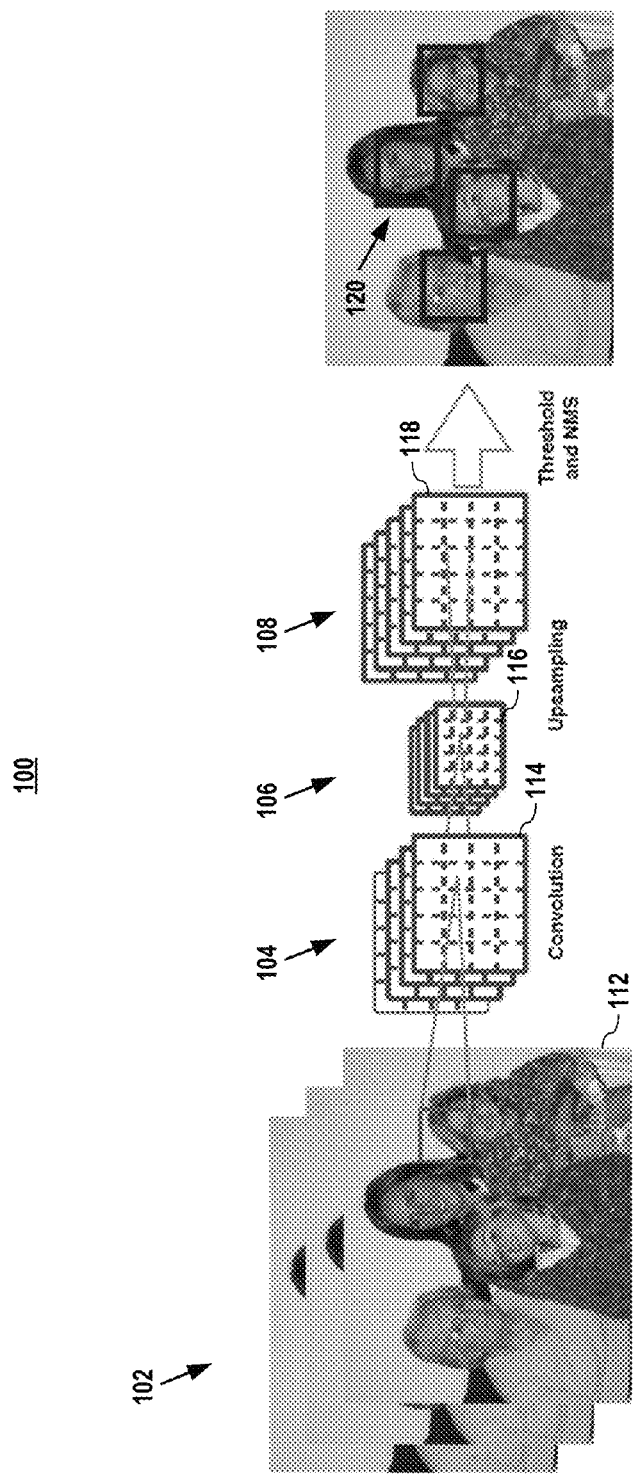
FIG. 1 illustrates an exemplary object detection pipeline for a convolutional network according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently. In this document, the term "DenseBox" shall be understood as referring to one or more embodiments of the present disclosure. Each reference mentioned in this patent document is incorporated by reference herein in its entirety.

Before the success of deep CNNs, the most widely used detection systems were based on a combination of independent components. Such systems involve, first, extracting handcrafted image features, such as Histogram of Oriented Gradients (HOG), Scale-Invariant Feature Transformation (SIFT), and Fisher Vector, at every location and scale of an image. Second, object models, such as pictorial structure model (PSM) and deformable part-based model (DPM) allow object parts (e.g., head, torso, arms and legs) to deform within geometric constraints. Finally, a classifier, such as boosting methods, linear support vector machine (SVM), latent SVM, and random forests, decides whether a candidate window is detected as containing an object.

The application of neural networks for detection tasks, such as face detection, has a long history. The first work may date back to early 1994, when Vaillant et al. in "Original approach for the localisation of objects in images" (IEEE Proceedings-Vision, Image and Signal Processing, 141(4): 245-250, 1994) proposed to train a CNN to detect faces in an image window. Later others presented neural-network-based face detection systems to detect upright frontal faces in an image pyramid. While, the performance of these early detector designs are far inferior to today's face detection systems, some similarities remain.

More recent designs use deep CNNs to locate objects. For example, OverFeat trains a convolutional layer to predict box coordinates for multiple class-specific objects from an image pyramid. MultiBox generates region proposals from a network having an output layer that simultaneously predicts multiple boxes that are used for R-CNN object detection. YOLO also predicts bounding boxes and class probabilities directly from full images in one evaluation. All these methods use shared computation of convolutions, which has been attracting increased attention due to its relatively efficient and accurate visual recognition.

Object detection often involves multi-task learning, such as landmark localization, pose estimation, and semantic segmentation. Some propose a tree structure model for joint face detection, pose estimation, and landmark localization. Some deep net based object detection designs integrate multi-task learning, for example, to simultaneously learn facial landmarks and expressions, or simultaneously use a pose joint regressor and sliding window body part detector in a deep network architecture.

However, most such object detection approaches rely on R-CNN, which separates detection into salient object proposal generation and region proposal classification. Some designs, such as YOLO and Faster R-CNN, have joined region proposal generation with a classifier in either one or two stages. Some believe that R-CNN with general proposal methods designed for general object detection may result in inferior performance in detection tasks, such as face detection, due to loss recall for small-sized faces and faces in complex appearance variations. Therefore, it would be desirable to have systems and methods that overcome the limitations of these existing designs.

FIG. 1 illustrates an exemplary object detection pipeline for a convolutional network according to various embodiments of the present disclosure. In embodiments, pipeline 100 receives input image 112 or image pyramid that is fed to network 104. After several layers of convolution and pooling, feature map 106 is upsampled and convolution layers are applied to obtain final output 108. In embodiments, output feature 108 map is converted to bounding boxes 120, and non-maximum suppression is applied to bounding boxes 120 that exceed a threshold.

In embodiments, a single convolutional network simultaneously outputs multiple predicted bounding boxes 120 and class confidences. In embodiments, except for a non-maximum suppression (NMS) step, components of object detection are modeled as an FCN, such that it becomes unnecessary to engage in region proposal generation.

In embodiments, in the test, system 100 receives input image 112 having an image size of, e.g., m×n and outputs a m/4×n/4 feature map 106 that comprises 5 channels.

In embodiments, defining the left top and right bottom points of a target bounding box in the output coordinate space as $p_t=(x_t, y_t)$ and $p_b=(x_b, y_b)$, respectively, each pixel i located at $(x_i, y_i)$ in the output feature map 108 may describe a bounding box having a 5-dimensional vector $$\hat{t}_i = \{\hat{s}, \widehat{dx}^t = x_i - x_t, \widehat{dy}^t = y_i - y_t, \widehat{dx}^b = x_i - x_b, \widehat{dy}^b = y_i - y_b\}_i$$

where $\hat{s}$ denotes the confidence score of being an object, and $\widehat{dx}^t$, $\widehat{dy}^t$, $\widehat{dx}^b$, $\widehat{dy}^b$ denote distances between the output pixel location and the respective boundaries of the target bounding box. In embodiments, NMS may be applied to those bounding boxes whose scores meet a certain threshold and discard others.

A. Ground Truth Generation

Figure 2:
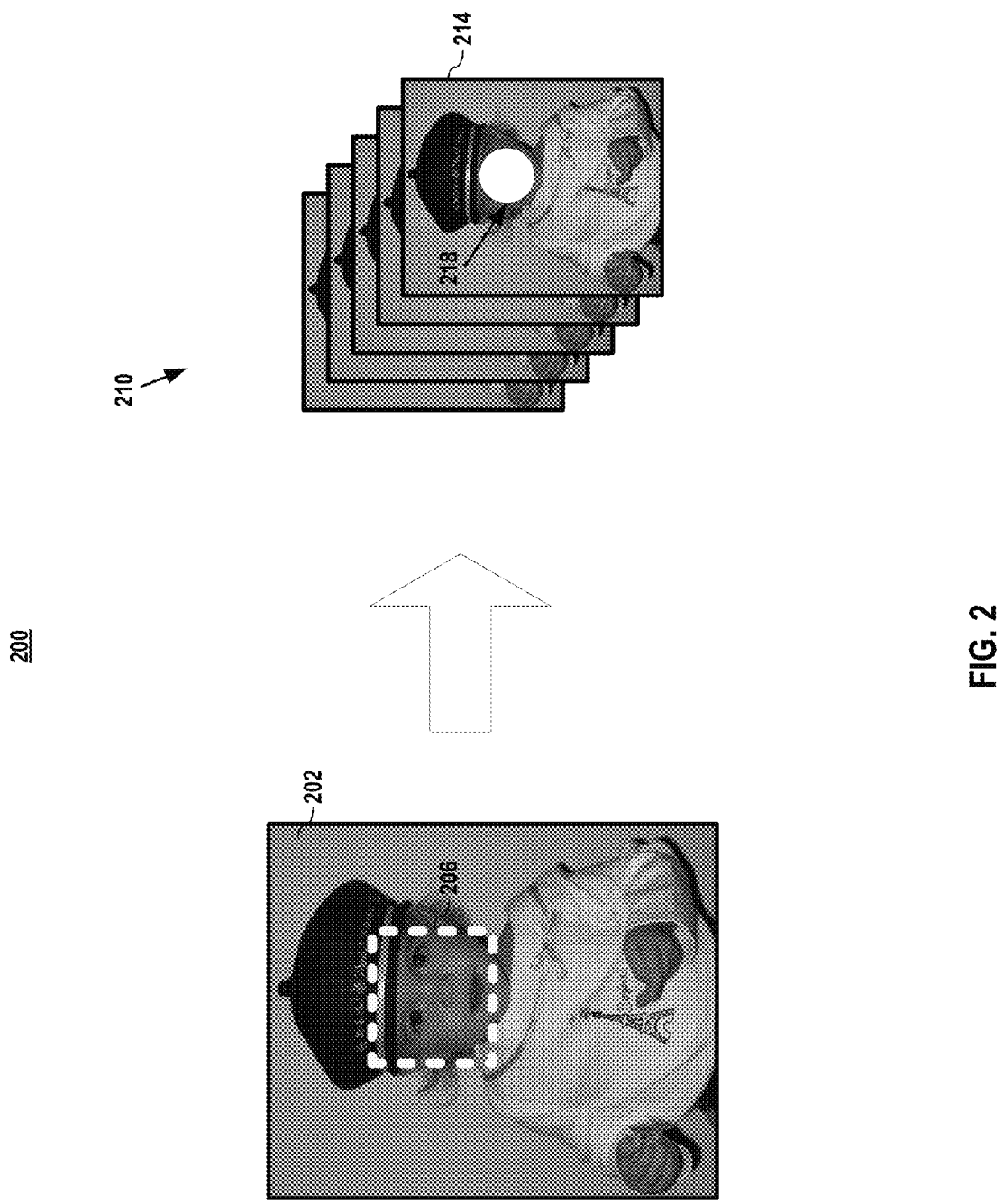
FIG. 2 illustrates the Ground Truth Map in training, according to various embodiments of the present disclosure.

FIG. 2 illustrates the Ground Truth Map in training, according to various embodiments of the present disclosure. The image on the left side shows the input patch, and the image on the right side shows a corresponding ground truth map.

In embodiments, the network is trained in a segmentation-like manner by feeding only a portion of the entire image 202 is to the network to reduce convolving on background data and, thus, to reduce computation time. Instead, in embodiments, patch 206 that comprises a face and relatively little background information is cropped for training purposes. In embodiments, the network is trained on a single scale that, for evaluation, is applied to different scales.

In example in FIG. 2, patch 206 is cropped and resized to 240×240. The face in the center of patch 206 has a height of approximately 50 pixels. The output ground truth in training is a 5-channel map 210 sized 60×60 and having a downsampling factor of 4. The positive labeled region in the first channel of ground truth map 210 is the area of a circle having a radius $r_c$ and being located in the center of face bounding box 218. The radius $r_c$ is proportional to the size of face bounding box 218, and its scaling factor is set to 0.3 times the box size in the output coordinate space. The remaining 4 channels comprise the distances between the pixel location of the output map and the left top and right bottom corners of the nearest bounding box.

In embodiments, if patch 206 comprises multiple faces, these are labeled as positive if they fall in a predetermined scale range (e.g., 0.8 to 1.25) relative to the face in the patch center, whereas faces that fall outside the scale range are treated as negative samples. The pixels of the first channel, which denote the confidence score of being in a class in ground truth map 210, are initialized with 0 and set to 1 if they fall within the region labeled as positive.

While this method of ground truth generation is similar to the segmentation work by Pinheiro et al. in "Learning to segment object candidates" (arXiv preprint arXiv: 1506.06204, 2015), unlike in Pinheiro, the pixel label is not decided by the location of the object in the patch. Instead, in embodiments, the pixel label is determined by the receptive field. In certain embodiments, the output pixel is labeled as 1 if it satisfies the constraint that its receptive field comprises an object roughly in the center and at a given scale. Each pixel may be treated as one sample since each 5-channel pixel describes a bounding box.

B. Model Design

Figure 3:
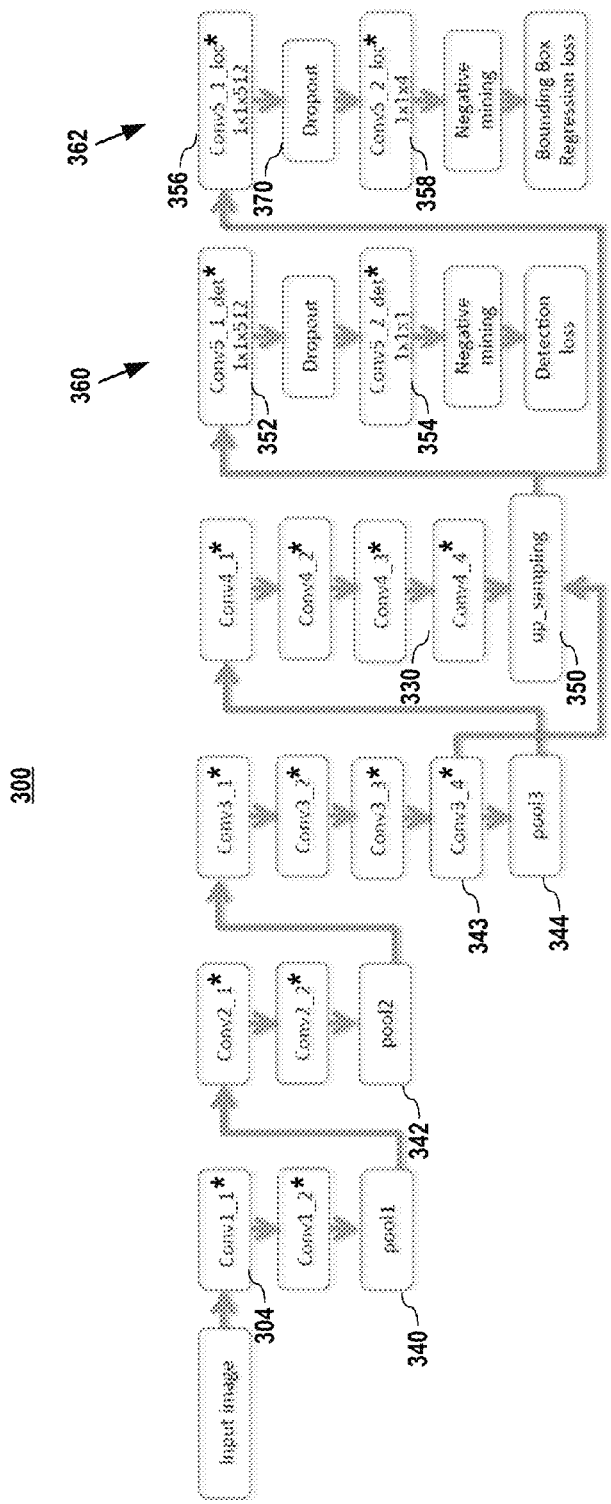
FIG. 3 illustrates a network architecture according to various embodiments of the present disclosure.

FIG. 3 illustrates a network architecture according to various embodiments of the present disclosure. Network architecture 300 in example in FIG. 3 is derived from the VGG 19 model used for image classification. Labels containing a (*) indicate learnable parameters. In embodiments, network architecture 300 comprises 16 convolution layers, 12 convolution layers labeled Conv1_1 304 through Conv4_4 330; and 3 pooling layers 340-344.

In embodiments, the output of Conv4_4 330 is fed into four 1×1 convolution layers 352-358, such that convolution layers 352-354 output a 1-channel map for class score, and convolution layers 356-358 predict the relative position of the bounding box via a 4-channel map acting as fully connected layers in a sliding-window fashion.

While pooling provides robustness against variance, it results in a relatively coarser resolution. As a result, it becomes difficult to distinguish between, e.g., two bounding boxes that are two pixels apart from each other. In order to mitigate this problem, in embodiments, once features are extracted and pooled, upsampling is performed to return to, e.g., 60×60 pixels. Upsampling is performed by bi-linear filtering, for example, to generate a 4×4 matrix from a 2×2 matrix patch using linear interpolation. In embodiments, to compute a final score, the upsampled feature map is input to two independent branches 360-362. In FIG. 3, the first branch begins with Conv5_1_det 352, a convolution layer for detection, and the second branch begins with Conv5_1_loc 356, a convolution layer for localization. One of ordinary skill in the art will appreciate that computations in the independent branches may be performed simultaneously.

In embodiments, dropout 370 samples sub-set of data from the feature map to learn a boundary and prevent overfitting when only a limited set of training data is available to train the network in a manner such as to observe sufficient data to obtain a clear decision boundary.

Multi-Level Feature Fusion.

In embodiments, features from different convolution layers are combined to enhance the performance of certain tasks, such as edge detection and segmentation. Part-level features focus on local details of objects to find discriminative appearance parts, whereas object-level or high-level features usually have a larger receptive field in order to recognize objects. A larger receptive field also comprises context information that may aid in predicting more accurate results.

For example, feature maps generated by layers Conv3_4 343 and Conv4_4 330 may be combined such that the receptive field (or sliding window size) of layer Conv3_4 343 is 48×48 (i.e., about the same size of the face size in training) and the receptive field of layer Conv4_4 330 is, e.g., 118×118, such that the feature map size generated by Conv4_4 330 is about half of that generated by Conv3_4 343 that may utilize global textures and context for detection.

In embodiments, to obtain a higher resolution, a bi-linear upsampling layer is used to transform feature maps to the same resolution.

C. Multi-Task Training

In embodiments, the ImageNet pre-trained VGG 19 network is used to initialize DenseBox. In embodiments, at initialization and prior to upsampling 350, the VGG 19 network initializes the first 12 convolution layers labeled Conv1_1 304 through Conv4_4 330, and replaces other layers in VGG 19 with four new convolution layers using xavier initialization.

In embodiments, like Fast R-CNN, the network has two sibling output branches. In embodiments, independent branch 360 outputs the confidence score $\hat{y}$ (per pixel in the output map) of being a target object. Given the ground truth label $y^* \in \{0,1\}$, the classification loss can be defined as follows:

$$\mathcal{L}_{cls}(\hat{y},y^*)=\|\hat{y}-y^*\|^2 \qquad (Eq.\ 1)$$

In embodiments, a loss functions, such as L2 loss, hinge loss, and cross-entropy loss may be use in both face and car detection tasks. In embodiments, independent branch 360 outputs the bounding-box regression loss, denoted as $\mathcal{L}_{loc}$, for example, to minimize the L2 loss between predicted location offsets $\hat{d}=(\hat{d}_{tx}, \hat{d}_{ty}, \hat{d}_{bx}, \hat{d}_{by})$ and targets $d^*=(d^*_{tx}, d^*_{ty}, d^*_{bx}, d^*_{by})$, as formulated by:

$$\mathcal{L}_{loc}(\hat{d},d^*)=\Sigma_{i\in\{tx,ty,bx,by\}}\|\hat{d}_i-d^*_i\|^2 \qquad (Eq.\ 2)$$

D. Balance Sampling

In embodiments, as part of the learning process negative samples are selected. It is noted that simply using all negative samples in a mini-batch may bias prediction towards negative samples, as negative samples dominate in samples. It is further noted that the detector may degrade if we penalize loss on those samples lying in the margin of positive and negative region. In embodiments, a binary mask is used for to indicate whether an output pixel is selected in training.

Ignoring Gray Zone.

In embodiments, for a gray zone, i.e., the area between positive and negative regions, the loss weight is set to 0, and for each pixel labeled non-positive in the output coordinate space, an ignore flag $f_{ign}$ is set to 1 if a pixel with positive label within $r_{near}=2$ pixel length exists.

Hard Negative Mining.

Analogous to the hard-negative mining procedure in SVM learning methods, in embodiments, learning is made more efficient by searching badly predicted samples rather than searching random samples. After negative mining, the badly predicted samples are relatively more likely to be selected, such that gradient descent learning on those samples reduces noise and, thus, leads to more robust prediction. In embodiments, negative mining may be performed efficiently by using information about previous decision boundaries (also referred to as online bootstraping). In embodiments, in the forward propagation phase, the classification loss (Eq. 1) of output pixels is sorted in descending order, and the top 1% are assigned as hard-negative. In the experiments discussed below, all positive labeled pixels (samples) are kept and the ratio of positive and negative was 1:1. In embodiments, about one half of the negative samples is sampled from hard-negative samples, and the other half is randomly selected from non-hard negative samples. For convenience, a flag $f_{sel}=1$ may be set for those pixels (samples) selected in a mini-batch.

Loss with Mask.

In embodiments, defining masks $M(\hat{t}_i)$ for each sample $\hat{t}_i=\{\hat{y}_i, \hat{d}_i\}$ as a function of flags mentioned above:

$$M(\hat{t}_i) = \begin{cases} f^i_{ign} \text{ or } f^i_{sel} \\ 1 \text{ otherwise} \end{cases} \quad \text{(Eq. 3)}$$

and combining the classification loss (Eq. 1) and bounding box regression loss (Eq. 2) with the masks, the multi-task loss may be represented as, $$\mathcal{L}_{det}(\theta)=\Sigma_i ((M(\hat{t}_i)\mathcal{L}_{cls}(\hat{y}_i,y^*_i)+\lambda_{loc}[y^*_i>0]M(\hat{t}_i)\mathcal{L}_{loc}(\hat{d}_i,d^*_i)) \quad \text{(Eq. 4)}$$

where θ is the set of parameters in the network, and the Iverson bracket function $[y^*_i>0]$ is activated only if the ground truth score $y^*_i$ is positive. A person of skill in the art will appreciate that the bounding box regression loss should be ignored for negative samples (background), since there is no notation for them.

One of skill in the art will also appreciate that combining may be performed in any other manner. In embodiments, the balance between classification and regression tasks is controlled by the parameter $\lambda_{loc}$. For example, the regression target d* may be normalized by dividing by the standard object height, which is 50/4 in ground truth map, and setting $\lambda_{loc}=3$.

Other Implementation Details.

In training, an input patch may be considered a "positive patch" if it comprises an object centered in the center at a specific scale. These patches comprise mainly negative samples around the positive samples. In embodiments, in order to fully explore the negative samples in the whole dataset, patches are cropped at random scale from training images, and resized to the same size and fed to the network. This kind of patch is called "random patch" herein, and, in embodiments, the ratio of "positive patches" and "random patches" in training is 1:1. In embodiments, to further increase the robustness of the network, randomly jitter is applied to the patches before feeding them into the network. For example, left-right flip, translation shift (of 25 pixels), and scale deformation (from [0.8, 1.25]) may be applied. In embodiments, mini-batch SGD with a batch size of 10 is used in training. The loss and output gradients should be scaled by the number of contributing pixels, so that both loss and output gradients are comparable in multi-task learning. In embodiments, the global learning rate starts with 0.001 and is reduced by a factor of 10 every 100,000 iterations. A momentum term weight of 0.9 and a weight decay factor of 0.0005 are used.

E. Refine with Landmark Localization

Figure 4A:
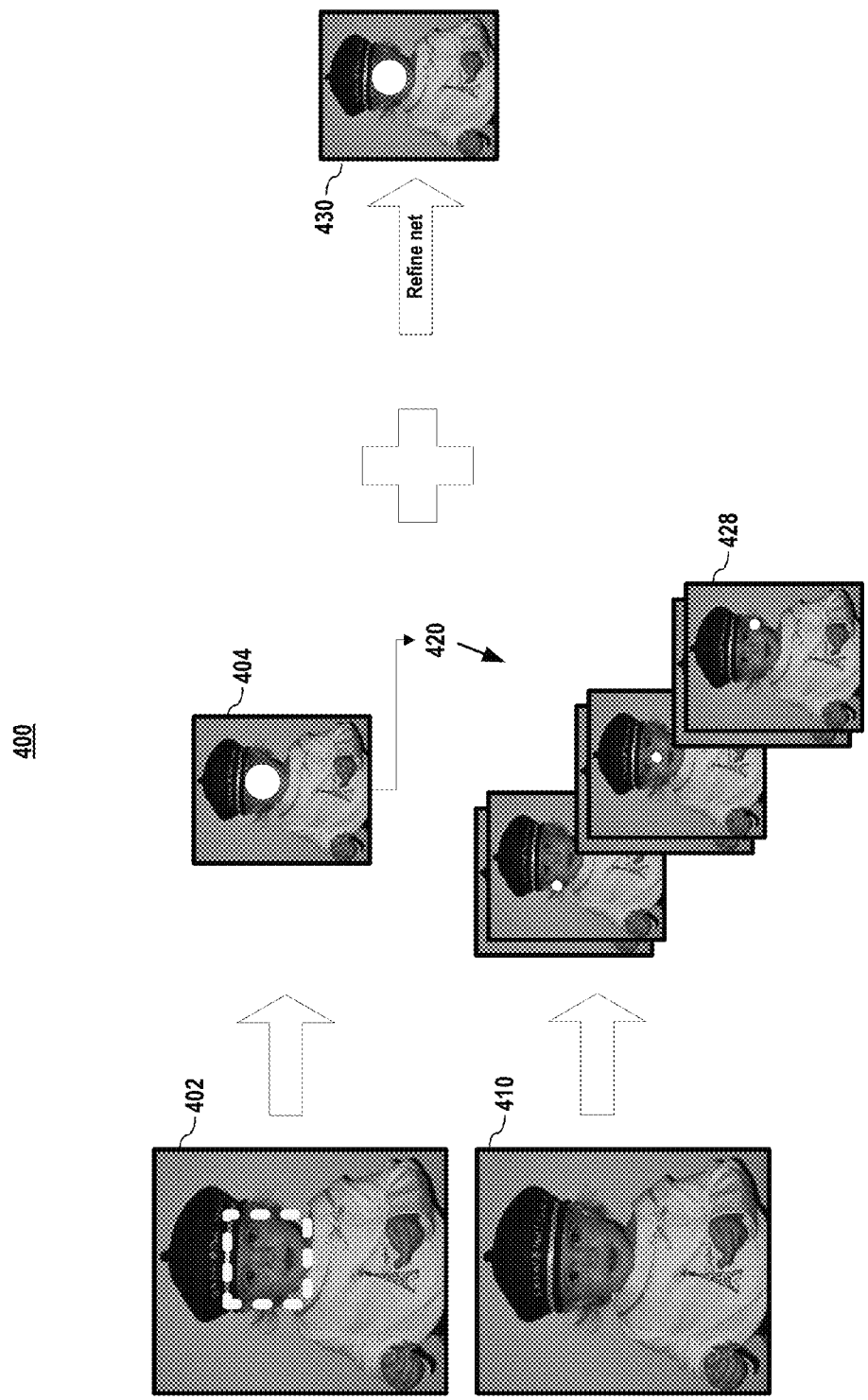
FIG. 4A illustrates an exemplary object detection pipeline with landmark localization, according to various embodiments of the present disclosure.
Figure 4B:
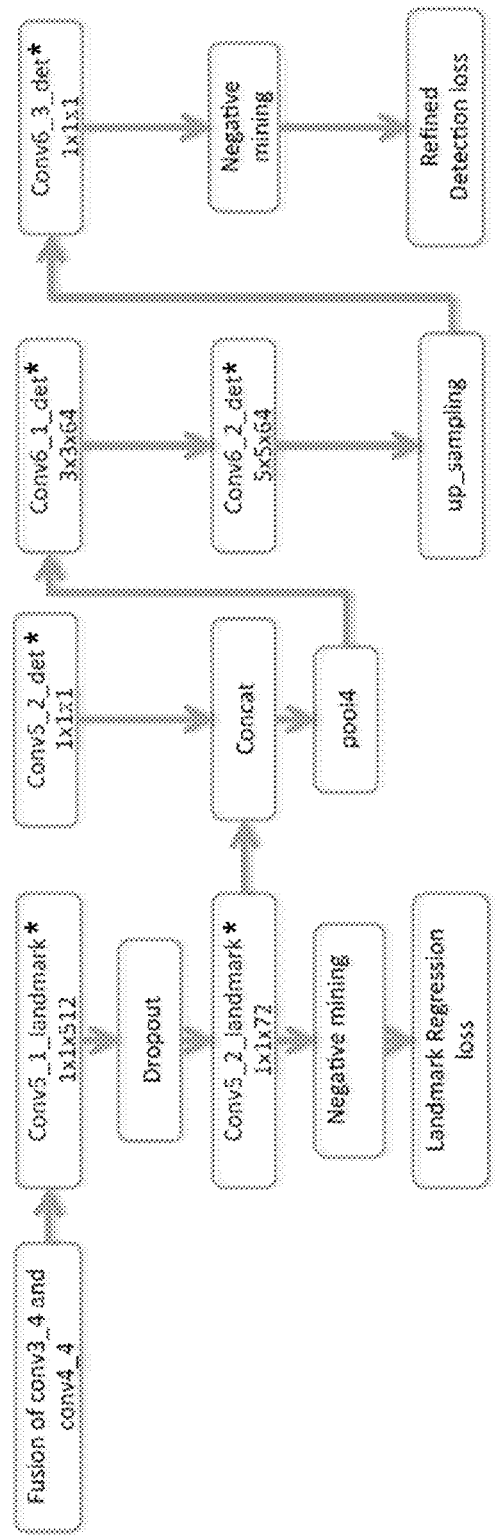
FIG. 4B illustrates an exemplary network architecture for landmark localization, according to various embodiments of the present disclosure.

FIG. 4A illustrates an exemplary object detection pipeline with landmark localization, according to various embodiments of the present disclosure. FIG. 4B illustrates an exemplary network architecture for landmark localization, according to various embodiments of the present disclosure.

In embodiments, landmark localization is achieved by stacking layers onto the fully convolutional architecture. Moreover, detection results may be refined through the fusion of landmark heatmaps and face score maps. As shown in the embodiment in FIG. 4, another sibling branch output for landmark localization is incorporated. Suppose there are N landmarks, the landmark localization branch outputs N response maps, with each pixel representing the confidence score of being a landmark at that location. The appearance of ground-truth maps used for this task is quite similar to the ground-truth for detection. In embodiments, For a landmark instance $l^k_i$, the $i^{th}$ instance of landmark k, its ground-truth is a positive labeled region located at the corresponding location on the $k^{th}$ response map in the output coordinate space. Note that the radius $r_l$ should be relative small (e.g., $r_l=1$) to prevent loss of accuracy. Similar to the classification task, the landmark localization loss $\mathcal{L}_{lm}$ is defined as a L2 loss between predicted values and labels, and in embodiments, negative mining is applied and regions discussed in the previous section are ignored.

In embodiments, the final output refine branch uses the classification score map and landmark localization maps as input to refine the detection results. In embodiments, to further increase detection performance, a high level spatial model may be used to learn the constraints of landmark confidence and bounding box scores. Some proposed a MRF-like model using modified convolution (SoftPlus convolution) with non-negative output to connect the distribution of spatial location for each body part. However, the model also uses Log and Exp stages that make the model difficult to train.

Embodiments of the present disclosure use convolutions with rectified linear unit (ReLU) activation to approximate a spatial model. Denoting the refine detection loss as $\mathcal{L}_{rf}$, which may be almost the same as the classification loss $\mathcal{L}_{cls}$ previously mentioned, since the predict map is generated by the refine branch, the full loss becomes $$\mathcal{L}_{full}(\theta)=\lambda_{det}\mathcal{L}_{det}(\theta)+\lambda_{lm}\mathcal{L}_{lm}(\theta)+\mathcal{L}_{rf}(\theta), \quad \text{(Eq. 5)}$$

where $\lambda_{det}$ and $\lambda_{lm}$ control the balance of the three tasks, and are assigned the values 1 and 0.5, respectively, in the experiments discussed below.

F. Comparison

Systems and methods of the present disclosure frame object detection as a regression problem and provide an end-to-end detection framework. Several recent object detection systems, such as YOLO and Faster R-CNN, have joined region proposal generation with classifier, key similarities and differences are pointed out next.

Traditional NN-based Face Detector.

Neural network-based face detector refers to those face detection system using neural network before the recent break-through results of CNNs for image classification.

Early works dating back to 1990s train neural network-based detectors that are activated only on faces having a specific size, and apply detectors on the image pyramid in a sliding-window fashion. While the systems and methods presented herein have a similar detection pipeline, embodiments use modern CNNs as detectors. Hence the systems and methods presented herein are in a sense "modern NN-based detectors."

OverFeat.

After the success application of deep CNNs for image classification, OverFeat might be the first object detector that trains a convolution neural network to perform classification and localization together. It applies a fully convolutional network at test time to perform sliding window detection more efficiently. However, unlike the multi-task jointly learned end-to-end detection networks in the present disclosure, OverFeat uses disjoint classification and localization in training and requires complex post-processing to produce the detection results.

Deep Dense Face Detector (DDFD).

DDFD, proposed by some, is a face detection system based on convolutional neural networks. It claims to have superior performance over RCNN at face detection task as proposal generation in R-CNN may miss some face regions. Although DDFD is a complete detection pipeline, it is not an end-to-end framework since it separates the class probability prediction and bounding box localization into different tasks that are performed and two different stages. In contrast, embodiments of the present disclosure can be optimized directly for detection and can be easily improved by incorporating landmark information.

Faster R-CNN.

Faster R-CNN also uses region proposals to find objects in an image. Unlike its former variants, the region proposals in faster R-CNN are produced by region proposal networks (RPNs) sharing convolutional feature computation with classifiers in the second stage. However, unlike the embodiments of the present disclosure, PRN requires predefined anchors and is trained on multi-scale objects.

MultiBox.

MultiBox trains a convolutional neural network to generate proposals instead of selective search. Both DenseBox and MultiBox are trained to predict bounding boxes in an image. Unlike the output translation-invariant bounding box generation in embodiments of the present disclosure, the MultiBox method generates 800 anchors.

YOLO is a unified object detection pipeline. While YOLO may be trained end-to-end from images, the model design differs from embodiments of the present disclosure in the output layers. The YOLO system takes a 448×448 image as input and outputs 7×7 grid cells, only 49 bounding boxes per image. In contrast, embodiments of the present disclosure use upsampling layers to keep a relatively high-resolution output, e.g., with a down-sampling scale factor of 4. This enables embodiments of the present disclosure to detect relatively small and highly overlapped objects that YOLO cannot handle. In addition, the YOLO system resizes each input image to a canonical size before mapping the image to a unique vector. In contrast, embodiments of the present disclosure are designed to handle an image of any input size and resolution without having to resize the image.

Figure 5A:
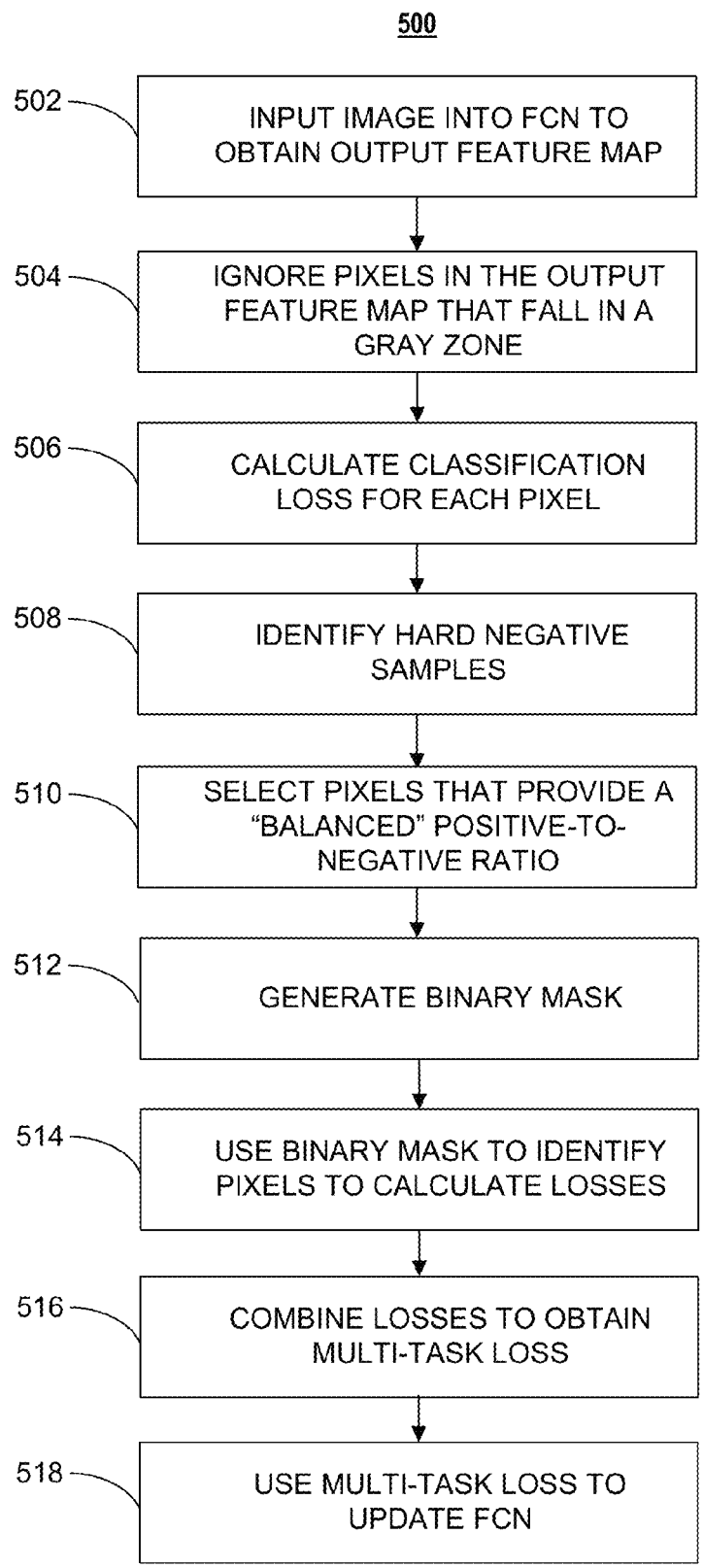
FIG. 5A is a flowchart illustrating a method to train an end-to-end multi-task object detection network using object landmarks, according to various embodiments of the present disclosure.

FIG. 5A is a flowchart illustrating a method to train an end-to-end multi-task object detection network using object landmarks, according to various embodiments of the present disclosure. The process for training the object detection network begins at step 502 by inputting an image into the end-to-end multi-task object detection network to obtain an output feature map that comprises a confidence score and a bounding box for each pixel in the output feature map.

At step 504, a first set of pixels in the output feature map that fall in a margin region between a positive region and a negative region is ignored.

At step 506, based on confidence scores from the output feature map, a classification loss is calculated for each pixel.

At step 508, a set of hard negative pixels that exceed a classification loss threshold is identified.

At step 510, a second set of pixels that comprise a ratio of positive pixel and negative pixels, is selected such that the negative pixels are selected, at least in part, from the set of hard negative pixels. In embodiments, all or some pixels with a positive classification loss are selected and are "balanced" with a set of pixels with a negative classification loss in which some portion may be hard negative pixels. Balanced may be a 1:1 ratio of positive to negative pixels, but may include other ratios.

At step 512, a binary mask that excludes the first set of pixels and includes the second set of pixels is generated.

At step 514, the binary mask is used to identify pixels to calculate classification loss and a bounding box regression loss.

At step 516, the classification loss and a bounding box regression loss are combined to obtain a multi-task loss.

At step 518, the calculated multi-task loss is used to update the end-to-end multi-task object detection network.

Figure 5B:
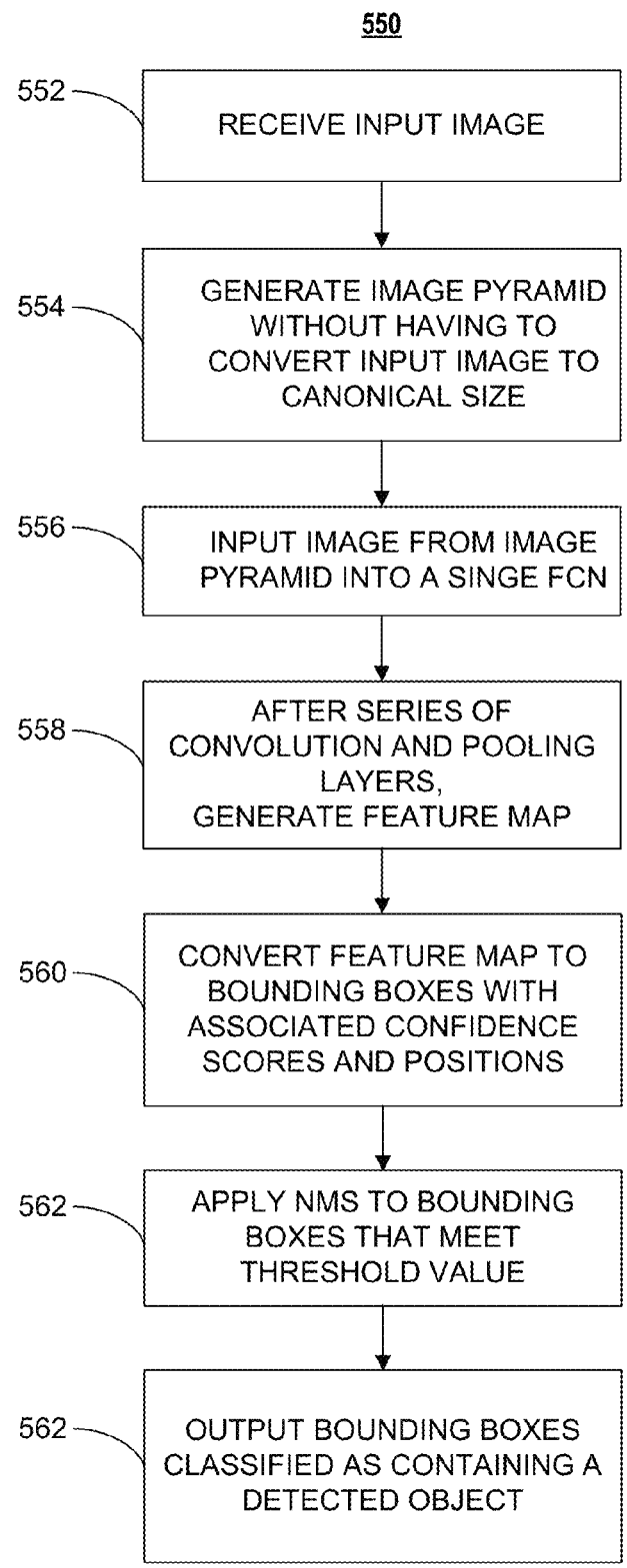
FIG. 5B is a flowchart illustrating end-to-end object detection method to detect objects in an image, according to various embodiments of the present disclosure.

FIG. 5B is a flowchart illustrating end-to-end object detection method to detect objects in an image, according to various embodiments of the present disclosure. The process for detecting objects in an image begins at step 552 when data representing an image is provided to an FCN.

At step 554, a convolution is applied to the FCN in a sliding window fashion.

At step 556, pooling is applied to generate a feature map is smaller in size than the image.

At step 558, based on the feature map, for a plurality of scales and locations in the image, a relative position of bounding boxes and confidence scores are predicted.

At step 560, NMS may be applied to bounding boxes that meet a certain threshold value.

At step 562, based on the relative position and confidence scores, it is decided whether a candidate window contains an object.

G. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

The performance of systems and methods of the disclosure on a Multi-Attribute Labeled Faces (MALF) dataset and KITTI car detection task are present next. Additionally, some embodiments are evaluated on those tasks with and without the aid of landmark annotation. The results show that multi-task learning with landmark localization can significantly boost detection performance. When compared with current state-of-the-art systems, the systems and methods of the disclosure achieve competitive results on object detection tasks. It noted that no comparison is made to the performance the original R-CNN, rather the performances of other methods that claim to use R-CNN or methods that have already compared themselves to R-CNN are highlighted.

H. MALF Detection Task

The MALF detection test dataset contains 5,000 images collected from the Internet. Unlike the widely used FDDB face detection benchmark that, which is collected from news photos that tend to show a frontal pose, the face images in MALF have a much larger diversity and are, thus, closer to real world applications when compared to FDDB.

Training and Testing.

Figure 7A:
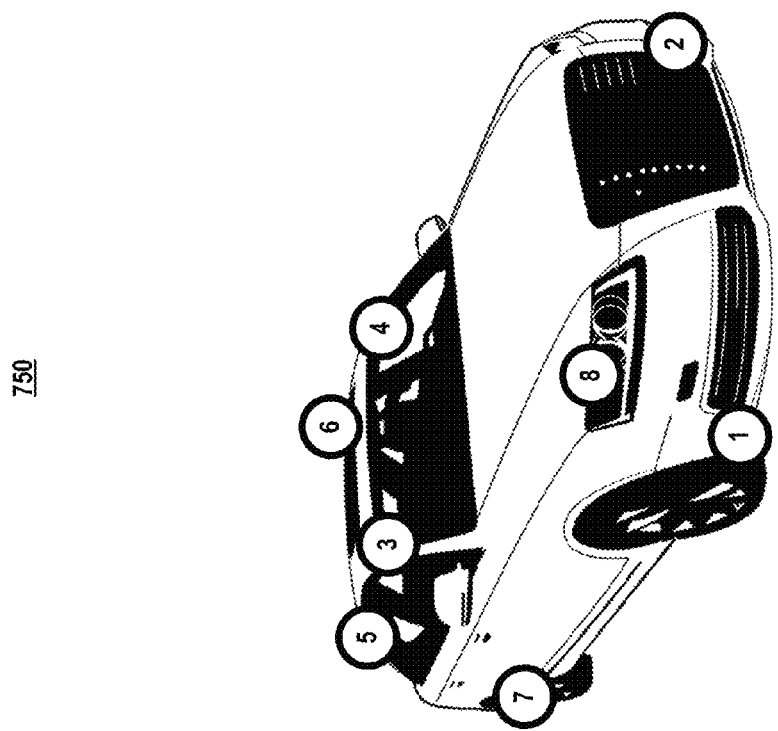
FIG. 7A illustrates a face that is annotated with 72 landmarks according to various embodiments of the present disclosure.
Figure 7B:
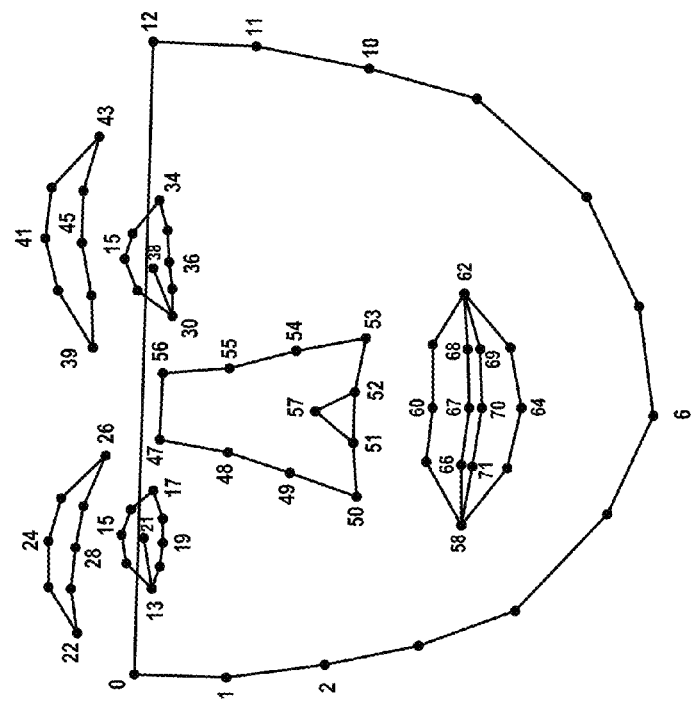
FIG. 7B illustrates an image of a car that is annotated with 8 landmarks, according to various embodiments of the present disclosure.

The two models described above are trained on 31,337 images comprising 81,024 faces that are annotated with 72 landmarks as illustrated in FIG. 7A. FIG. 7B illustrates an image of a car 750 that is annotated with 8 landmarks, according to various embodiments of the present disclosure. For comparison reasons, one of the models uses only bounding box information, while the other model uses both bounding box and landmark information. Both models are initialized with ImageNet pre-trained VGG19 model. Faces 700 in training are roughly scaled to a height of 50 pixels and, as previously described in context with Multi-Task Training, the scale jitter range is set to [0.8, 1.25].

At testing, images are first selectively down sampled such that for each image the longest side of an image does not exceed 800 pixels. Then the model is tested on each image at several scales. The test scale starts from $2^{-3}$ to $2^{1.2}$ with the step of $2^{0.3}$. This setting enables the models to detect faces 700 having a height of 20 pixels to 400 pixels. The non-maximum suppression IOU threshold in face detection is set to 0.5. Under this configuration, it may take several seconds to process one image in MALF dataset on an Nvidia K40 GPU.

Figure 6A:
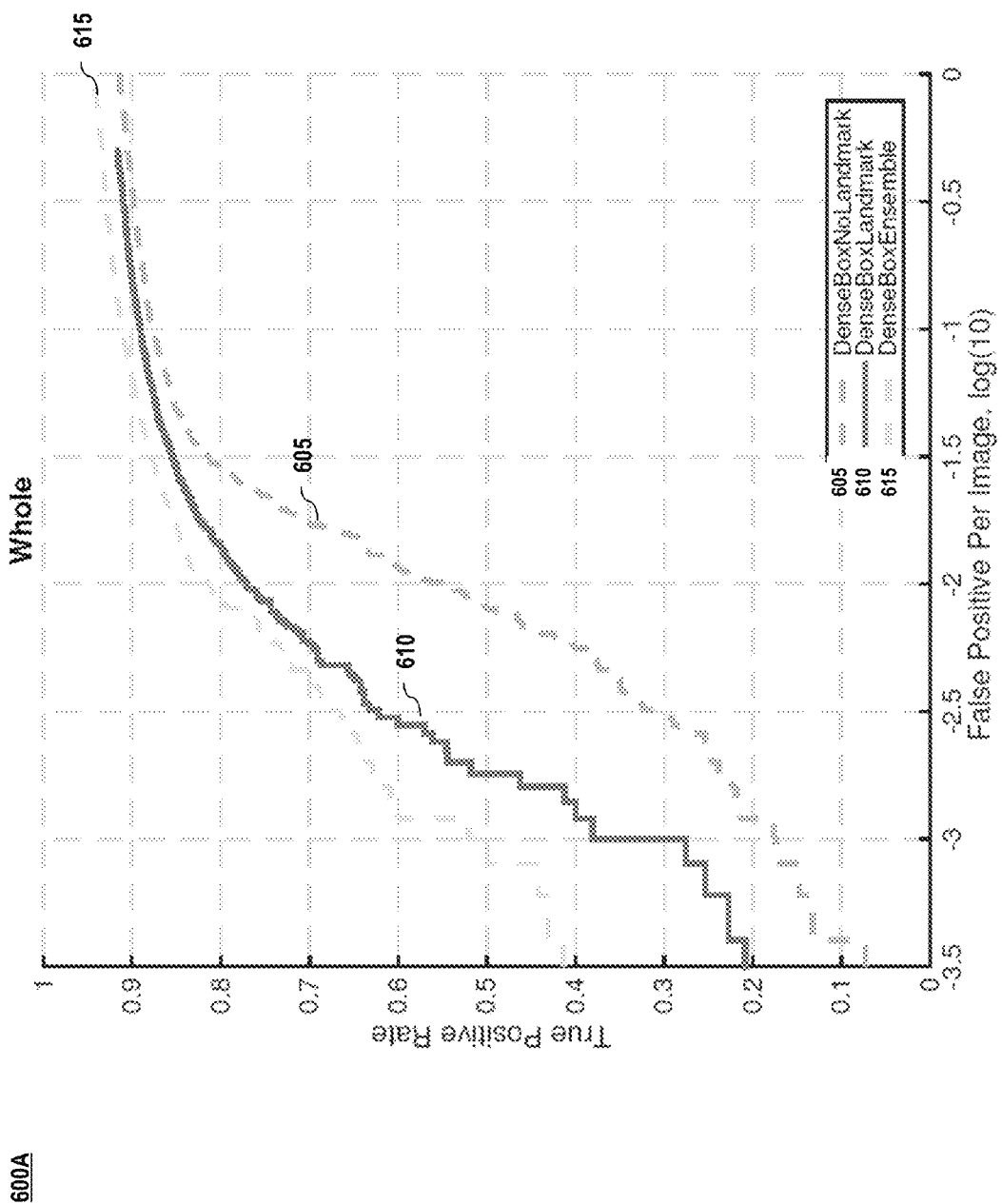
FIG. 6A illustrates experimental results comparing different DenseBox embodiments, according to various embodiments of the present disclosure.
Figure 6B:
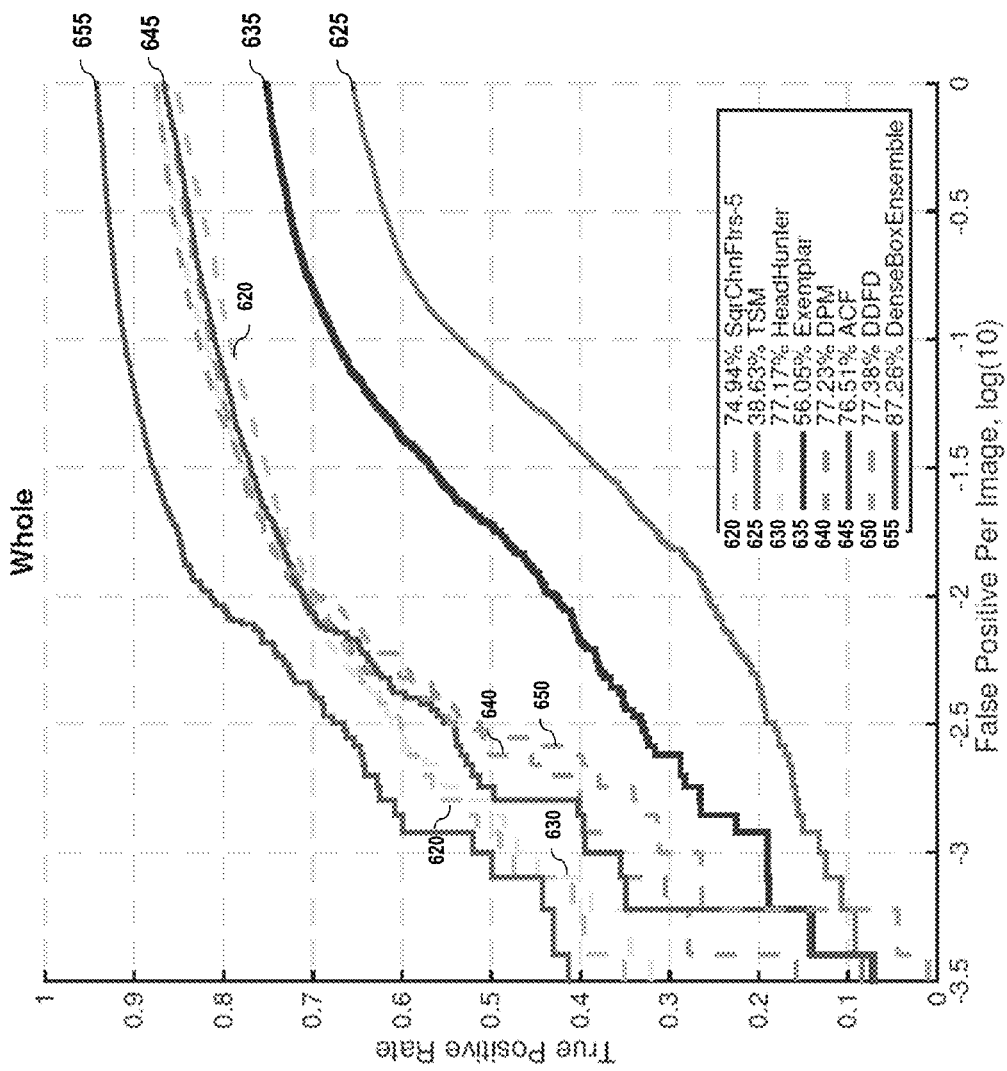
FIG. 6B compares the mean recall rate of traditional detection systems to a DenseBox embodiment, according to various embodiments of the present disclosure.

FIGS. 6A and 6B illustrate experimental results obtained on MALF datasets. FIG. 6A shows a comparison of three different different DenseBox embodiments, according to various embodiments of the present disclosure. The label "DenseBoxNoLandmark" in FIG. 6A denotes a version of DenseBox that does not utilize landmark localization in training. The label "DenseBoxLandmark" denotes a version of DenseBox that incorporates landmark localization, and the label "DenseBoxEnsemble" denotes the result of ensembling 10 DenseBox models with landmarks from different batch iterations. As the results illustrate, landmark localization significantly improves face detection performance. Additionally, the models trained with different batch iterations still have high diversity since another significant boost has been seen by the model ensemble.

FIG. 6B compares the mean recall rate of traditional detection systems to a DenseBox embodiment, according to various embodiments of the present disclosure. When comparing the best performing model 655 of DenseBox with other state-of-the-art methods on a MALF dataset, model 655 achieves a mean recall rate of 87.26% and outperforms DDFD, which claims better face detection performance than R-CNN, by almost 10%.

I. KITTI Car Detection Task

The KITTI object detection benchmark consists of 7481 training images and 7518 test images. The total number of objects in training is 51,867, with cars accounting for only 28,742 objects. The key difficulty of KITTI car detection task is that a great amount of cars is both small in size (height=40 pixels) and occluded. To overcome this difficulty, existing designs employ careful part and occlusion modeling.

Training and Testing.

As with face detection, two models—one with and one without landmark localization—are trained on the KITTI object detection training set. Since KITTI does not provide landmarks for cars, 8 landmarks shown in FIG. 5 are annotated for 7790 cars (height=50 pixels) equaling roughly 27% of the total number of cars.

The testing procedure is the same as for face detection, except that car images are not downsampled. The evaluation metric for the KITTI car detection task is different from general object detection as KITTI requires an overlap of 70% for true positive bounding box, while other tasks, such as face detection, only require 50% overlap. This strict criterion requires highly accurate car localization. On KITTI, the non-maximum suppression IOU threshold is set to 0.75.

FIG. 7C includes a table, TABLE 1, which illustrates experimental results comparing average precision on KITTI car detection task of traditional detection systems to a DenseBox embodiment according to various embodiments of the present disclosure. As shown in TABLE 1, even the partially annotated landmark localization information (27%) increases detection performance. On average, the model using landmark localization slightly outperforms the model that does not use landmark localization by 0.9% in average precision. The improvement in performance is not as great as for face detection. One possible reason may be the insufficiency of landmark information, both the amount (27% for car detection vs. 100% for face detection) and the quality (8 landmarks for car detection vs. 74 for face detection). Compared with other methods, DenseBox still achieves competitive results. DenseBox defeats traditional detection systems, such as Regionlets and spCov, by a large margin. Average precision on moderate car is 85.74%, slightly better than DeepInsight, which uses a R-CNN framework with ImageNet pre-trained GoogLeNet.

The presented model was ranked as the number 1 model for 4 months until an anonymous submission titled "NIPS ID 331," which uses stereo information for training and testing took over. Recently, a method named "DJML" outperformed all other methods.

J. System Embodiments

Figure 8:
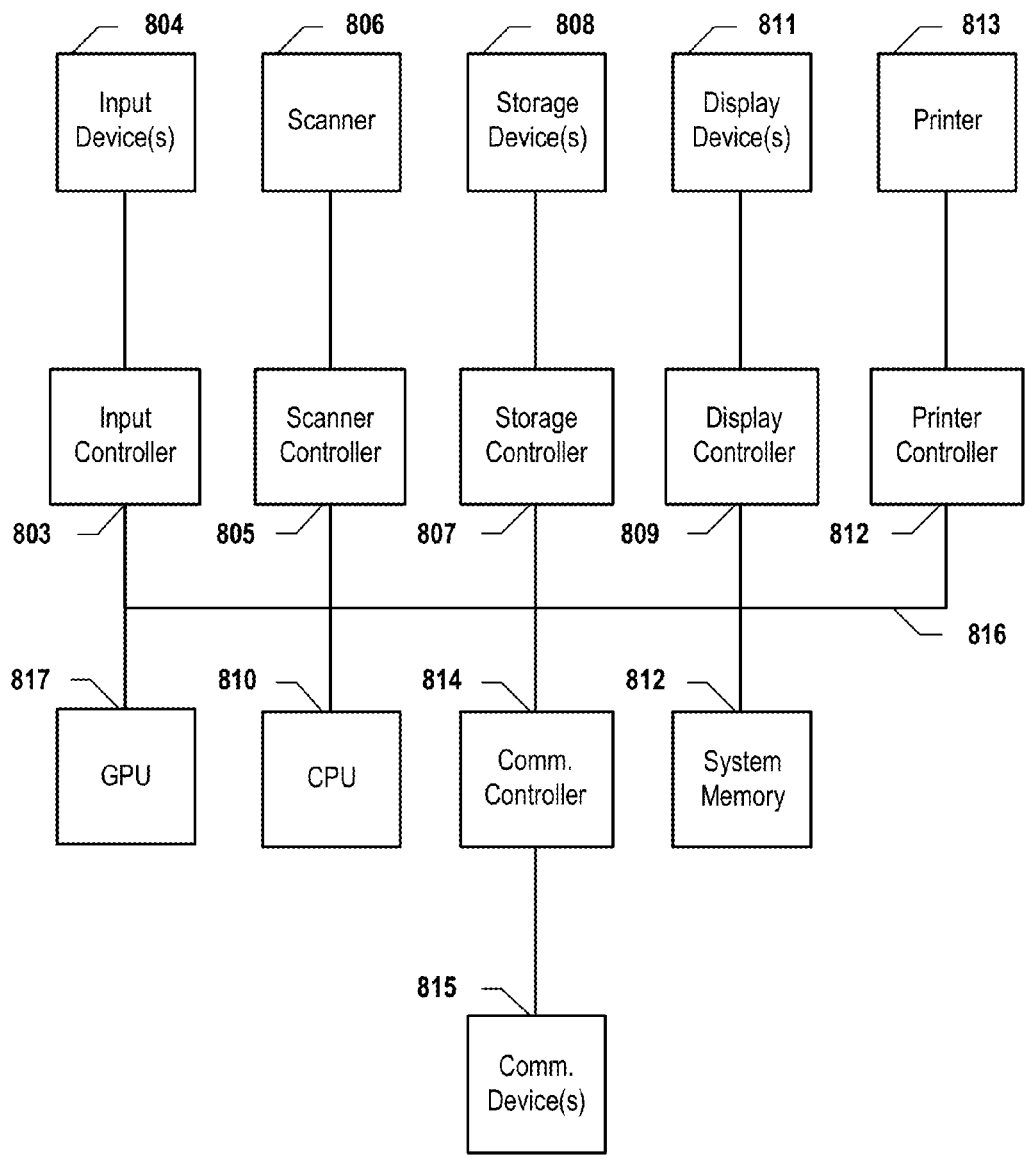
FIG. 8 depicts a simplified block diagram of a computing system comprising an FCN to perform end-to-end multi-task object detection, according to various embodiments of the present invention.

FIG. 8 depicts a simplified block diagram of a computing system comprising an FCN to perform end-to-end multi-task object detection, according to various embodiments of the present invention. It will be understood that the functionalities shown for system 800 may operate to support various embodiments of an information handling system—although it shall be understood that an information handling system may be differently configured and include different components. As illustrated in FIG. 8, system 800 includes a central processing unit (CPU) 801 that provides computing resources and controls the computer. CPU 801 may be implemented with a microprocessor or the like, and may also include a graphics processor and/or a floating point coprocessor for mathematical computations. System 800 may also include a system memory 802, which may be in the form of random-access memory (RAM) and read-only memory (ROM).

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities and applications which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the examples and embodiments herein are exemplary and not limiting to the scope of the present invention. It is intended that all permutations, enhancements, equivalents, combinations, and improvements thereto that are apparent to those skilled in the art upon a reading of the current document are included within the true spirit and scope of the present invention.

What is claimed is:

1. A method to detect an object in an image, the method comprising:
   receiving an input image;
   inputting the input image into a fully convolutional neural network (FCN) without requiring a pre-processing step to convert the input image into a canonical size, the FCN comprising:
   a series of convolution layers and pooling layers that generate feature maps; and
   an upsampling layer that provides input to a first set of convolution layers to detect confidence scores and a second set of convolution layers to detect position;
   an output feature map that comprises confidence scores and corresponding positions;
   converting the output feature map to bounding boxes, each bounding box being associated with a position in the input image and a confidence score for containing the object within the bounding box; and
   outputting a set of bounding boxes having confidence scores that meet a threshold level that classifies the object as being contained in each bounding box.

2. The method according to claim 1, further comprising applying non-maximum suppression (NMS) to the bounding boxed to obtain a set of bounding boxes.

3. The method according to claim 1, wherein the input image is converted to an image pyramid prior to inputting the input image into the FCN.

4. The method according to claim 1, wherein the at least some of the set of bounding boxes are not required to have the same aspect ratio.

5. The method according to claim 1, wherein at least some of the convolution layers act as fully connected layers in a sliding window fashion.

6. The method according to claim 5, wherein the at least some of the convolution layers are fully connected 1×1 convolutional layers associated with the confidence score and the position.

7. The method according to claim 1, wherein each pixel in the output feature map represents a multi-dimensional vector that comprises the confidence score, the multi-dimensional vector defining a relationship between each pixel and the boundary box that indicates a detected object, the multi-dimensional vector defining a distance between an output pixel location within a boundary of the boundary box.

8. The method according to claim 1, wherein the FCN has been trained in an end-to-end training that combines at least one of a classification score map and a landmark localization map to refine detection results when learning model parameters and image features.

9. The method according to claim 8, wherein the FCN comprises a sibling branch that is used to generate the landmark localization map during a joint multi-task training.

10. A method to train using an end-to-end multi-task detection network, the method comprising:
inputting an image into a fully convolutional neural network (FCN) detection system to obtain an output feature map comprising a confidence score and a bounding box for each pixel in the output feature map;
ignoring a first set of pixels in the output feature map that fall in a margin region between a positive region and a negative region;
calculating a classification loss for each pixel based on confidence scores from the output feature map;
identifying a set of hard negative pixels that exceed a classification loss threshold;
selecting a second set of pixels that comprise a ratio of positive pixel and negative pixels, the negative pixels being selected, at least in part, from the set of hard negative pixels;
generating a binary mask that excludes the first set of pixels and includes the second set of pixels;
using the binary mask to identify pixels to calculate classification loss and a bounding box regression loss and combining them to obtain a multi-task loss; and
using the multi-task loss to update the FCN detection system.

11. The method according to claim 10, wherein the FCN further comprises a landmark localization branch and a refine branch, the landmark localization branch generates a landmark localization map such that each pixel in the output feature map represents a confidence score of a landmark being at a landmark location.

12. The method according to claim 10, wherein calculating the bounding box regression loss reduces an L2 loss between predicated location offsets and regression targets.

13. The method according to claim 10, wherein the step of applying negative mining comprises selecting negative samples by sorting classification losses of the output pixels and then assigning negative labels to a portion of the classification losses that has the highest values.

14. The method according to claim 10, wherein the ratio of positive pixel and negative pixels, the negative pixels being selected is equal.

15. The method according to claim 10, further comprising generating a set of ground truth images such that a first channel of a ground truth map comprises a positive labeled region that comprises a circle located at the center of the bounding box and, the radius of the circle being proportional to a size of the bounding box.

16. The method according to claim 10, further comprising applying a jitter augmentation to random patches from training images and feed the random patches to the FCN, the random patches being cropped and resized.

17. The method according to claim 10, further comprising setting pixel labels associated with a receptive field to 1 if, at a given scale, the receptive field comprises an object approximately in its center.

18. A single-stage fully convolutional neural network (FCN)-based object detector to detect objects in an image, the object detector comprising:
non-transitory computer-readable medium or media comprising one or more sequences of instructions which, when executed by at least one processor, causes steps to be performed comprising:
receiving an input image;
inputting the input image into a fully convolutional neural network (FCN) without requiring a pre-processing step to convert the input image into a canonical size, the FCN comprising:
a series of convolution layers and pooling layers that generate feature maps; and
an upsampling layer that provides input to a first set of convolution layers to detect confidence scores and a second set of convolution layers to detect position;
an output feature map that comprises confidence scores and corresponding positions;
converting the output feature map to bounding boxes, each bounding box being associated with a position in the input image and a confidence score for containing the object within the bounding box; and
outputting a set of bounding boxes having confidence scores that meet a threshold level that classifies the object as being contained in each bounding box.

19. The object detector according to claim 18, wherein the FCN is an end-to-end detection network.

20. The object detector according to claim 19, wherein the end-to-end detection network comprises a jointly optimized pipeline.

* * * * *